March 21, 1961 W. H. NIEBLING 2,975,983
GARDEN HOSE SAFETY VALVE
Filed Nov. 4, 1959
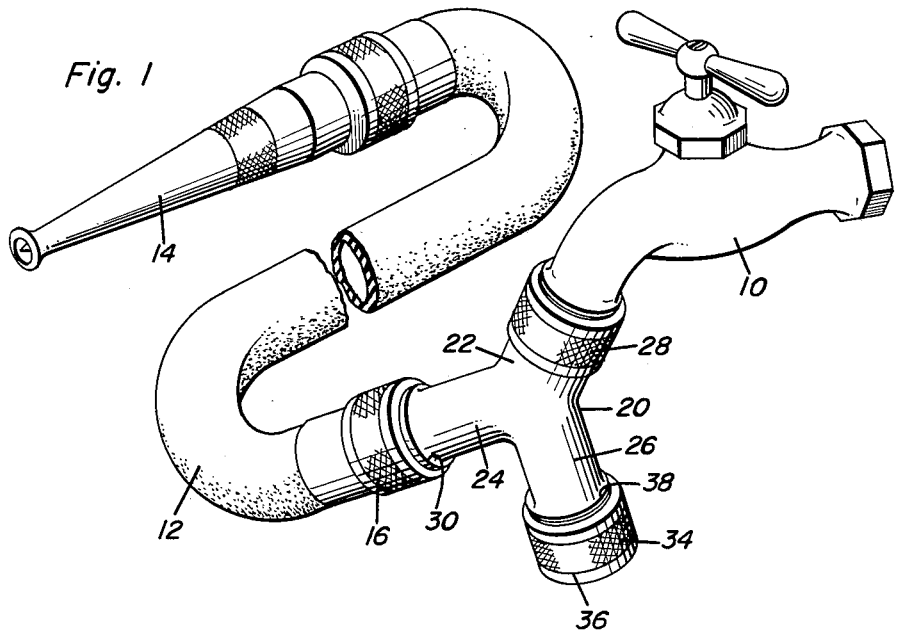
Fig. 1
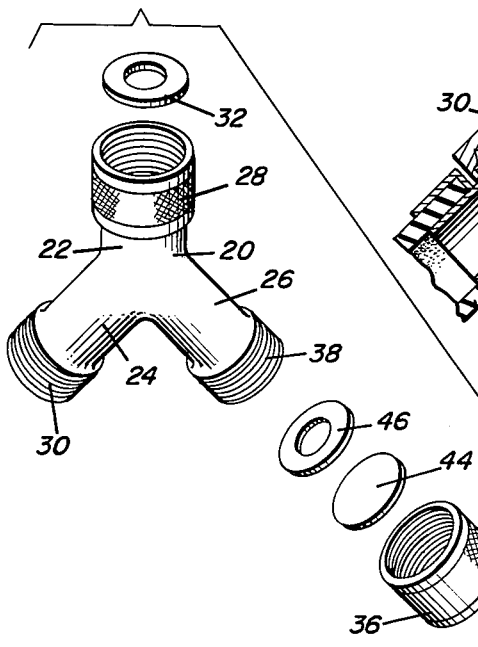
Fig. 3
Fig. 2
Warren H. Niebling
INVENTOR.
BY *Clarence A. O'Brien*
*and Harvey B. Jacobson*
Attorneys 2,975,983
GARDEN HOSE SAFETY VALVE Warren H. Niebling, 303 Suffolk Road, Flourtown, Pa.

Filed Nov. 4, 1959, Ser. No. 850,885

2 Claims. (Cl. 239—547)

This invention relates to protective devices and more particularly to a simple device to function as a safety valve to prevent leaks or actual bursting of flexible hoses, for example garden hoses attributable to excessive water pressure therein.

An object of the invention is to provide an inexpensive and very simple device adapted to be connected between a garden hose and source of water under pressure, usually a valve, the protective device having a rupturable member whose strength is less than the strength of the garden hose so that when excessive pressure build up exists in the garden hose, the rupturable member will fail before any part of the garden hose. This is especially useful when the garden hose is closed at the nozzle end.

Briefly, the invention is embodied in a fitting, for example a Y or a T operatively connected between the valve and the garden hose. This fitting has provision for receiving one end of the garden hose and provision for connection to the valve. This fitting also has provision for the safety valve assembly which is of very simple construction and wherein the rupturable member is renewable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the safety device in use.

Figure 2 is a longitudinal sectional view of a portion of the assembly in Figure 1.

Figure 3 is an exploded perspective view of the garden hose safety device.

In the accompanying drawings there is illustrated a conventional valve 10 and a conventional sill cock or garden hose 12 equipped with nozzle 14. The hose has a coupling 16 at one end, this being of standard construction and ordinarily found on one end of all conventional garden hoses.

Safety device 18 is made of very simple construction. It consists of a fitting 20, for example a T or a Y having three branches 22, 24 and 26. One branch has an internally threaded sleeve 28 either fixed thereto or rotationally connected therewith such as fitting 16 is rotationally connected with one end of hose 12. Branch 24 has an externally threaded end 30 to which fitting 16 is operatively connected, there ordinarily being a washer 32 interposed between the innermost land of fitting 16 and the extremity of the valve 10. In this resistance, the washer 32 is interposed between the land within fitting 16 and the outer surface of branch end 30.

Branch 26 has a safety valve assembly 34 connected thereto. The safety valve assembly is made of only three parts. There is an apertured cap or sleeve 36 having internal threads so as to be detachably threaded on the threaded end 38 of branch 26. A transverse wall 40 is connected with sleeve 36 and has an aperture 42 of predetermined size in the center thereof. The size of the aperture governs the cross-sectional area of the rupturable disc or member 44 exposed to the pressure within the various branches of fitting 20. The final part is the washer 46 interposed between the rupturable member 44 and the outer extremity of end 38. The washer holds rupturable member 44, which functions as a safety valve, in firm contact with the inner surface of wall 40.

The rupturable member may be made of a number of materials, for example plastic or rubber. The strength of the disk is less than the strength of the hose insofar as resistance to pressure forces are concerned. Consequently, when there is a build up of pressure within the hose which would be dangerous insofar as damage or destruction of the hose is concerned, rupturable member 44 breaks thereby immediately relieving the pressure in the hose. It is a quite simple matter to remove and replace the rupturable member 44 thereby renewing the valve assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a sill cock, a Y-fitting having one of its branches threadedly connected to said sill cock, a hose having one end threadedly connected to another branch of the fitting, a control nozzle on the other end of said hose, and a safety valve on the third branch of the fitting and operable at a pressure below the pressure-resisting capacity of the hose.

2. In combination, a sill cock, a Y-fitting having one of its branches threadedly connected to said sill cock, a hose having one end threadedly connected to another branch of the fitting, a control nozzle on the other end of said hose, and a safety valve on the third branch of the fitting and operable at a pressure below the pressure-resisting capacity of the hose, said safety valve including an apertured cap threaded on the fitting, and a thin rupturable rubber disc interposed between said cap and said fitting.

References Cited in the file of this patent

UNITED STATES PATENTS

| | | |
|---|---|---|
| 583,467 | Griffiths | June 1, 1897 |
| 2,580,426 | Heigis | Jan. 1, 1952 |
| 2,861,569 | Emerson | Nov. 25, 1958 |